United States Patent
Kinsella et al.

(10) Patent No.: US 11,149,502 B2
(45) Date of Patent: Oct. 19, 2021

(54) DRILL PIPE

(71) Applicants: Douglas Kinsella, Sturgeon County (CA); Steven Campbell, Leduc (CA)

(72) Inventors: Douglas Kinsella, Sturgeon County (CA); Steven Campbell, Leduc (CA)

(73) Assignee: Douglas Kinsella, Sturgeon Country (CA)

( * ) Notice: Subject to any disclaimer, the term of this patent is extended or adjusted under 35 U.S.C. 154(b) by 333 days.

(21) Appl. No.: 15/862,921

(22) Filed: Jan. 5, 2018

(65) Prior Publication Data

US 2018/0187496 A1 Jul. 5, 2018

(30) Foreign Application Priority Data

Jan. 5, 2017 (CA) .................. CA 2953583

(51) Int. Cl.
| | |
|---|---|
| *E21B 17/22* | (2006.01) |
| *E21B 17/042* | (2006.01) |
| *E21B 17/18* | (2006.01) |
| *E21B 17/00* | (2006.01) |
| *E21B 7/04* | (2006.01) |
| *F16L 9/00* | (2006.01) |

(52) U.S. Cl.
CPC .............. *E21B 17/22* (2013.01); *E21B 7/046* (2013.01); *E21B 17/00* (2013.01); *E21B 17/042* (2013.01); *E21B 17/18* (2013.01); *F16L 9/006* (2013.01)

(58) Field of Classification Search
CPC combination set(s) only.
See application file for complete search history.

(56) References Cited

U.S. PATENT DOCUMENTS

| | | | | |
|---|---|---|---|---|
| 1,956,200 | A | | 4/1934 | Rector |
| 2,246,418 | A | * | 6/1941 | Froome .................. E21B 17/22 |
| | | | | 175/323 |
| 3,156,106 | A | * | 11/1964 | Crane ................... E21B 17/073 |
| | | | | 464/20 |
| 3,339,380 | A | * | 9/1967 | Fox ....................... E21B 17/073 |
| | | | | 464/20 |
| 3,999,901 | A | * | 12/1976 | Tschirky .................. E21B 4/02 |
| | | | | 418/48 |

(Continued)

*Primary Examiner* — Giovanna Wright
*Assistant Examiner* — Ronald R Runyan
(74) *Attorney, Agent, or Firm* — Finch & Maloney, PLLC; Michael J. Bujold; Jay S. Franklin

(57) ABSTRACT

A drill pipe has a tubular body with a first end, a second end, an outer wall and an inner wall. A first connection end is connected to the first end of the tubular body and a second connection end is connected with the second end of the tubular body. The first connection end and the second connection end have an inner wall and an outer wall, the outer wall is substantially cylindrical in shape and the inner wall defines a central cavity. The first connection end and the second connection end are sized to allow for mating with a corresponding drill pipe. The outer wall of the tubular body is substantially cylindrical in shape. The inner wall of the tubular body defines a central cavity that is in fluid communication with the central cavity of the first connection end and the second connection end. The inner wall has at least one land and at least one groove. The at least one groove has at least one twist along the length of the tubular body.

40 Claims, 9 Drawing Sheets

(56) References Cited

U.S. PATENT DOCUMENTS

| | | | |
|---|---|---|---|
| 4,508,375 A * | 4/1985 | Patterson | F16L 15/001 |
| | | | 285/334 |
| 5,332,049 A | 7/1994 | Tew | |
| 7,040,422 B2 | 5/2006 | Springer | |
| 7,458,617 B2 | 12/2008 | Leslie et al. | |
| 7,814,996 B2 | 10/2010 | Indrupskiy et al. | |
| 8,287,005 B2 | 10/2012 | Leslie et al. | |
| 2019/0093287 A1 * | 3/2019 | D'Amico, III | D21F 5/10 |

* cited by examiner

DRILL PIPE

FIELD OF THE DISCLOSURE

The present application relates generally to drill pipe used in downhole drilling operations.

BACKGROUND

This section provides background information to facilitate a better understanding of the various aspects of the invention. It should be understood that the statements in this section of this document are to be read in this light, and not as admissions of prior art.

Drill pipe conveys a rotary torque from a surface drive to a drill bit, carries a tensile load and acts as a conduit through which drilling fluids may travel. In the past, drill pipe was not generally used in a compressive state to drill a well. A bottom hole assembly was designed to carry the compressive load needed for drilling. The bottom hole assembly was typically comprised of thick walled tubulars that were several times heavier than drill pipe and were named drill collars. The drill collars were designed with thick walls to manage large vertical compressive loads without bending, however this causes them to have a high mass. Due to their excessive weight, however, drill collars are of limited use in horizontal applications as the frictional forces of the drill collar on the bottom of the well bore become too severe to overcome.

The bottom hole assembly for horizontal wells generally comprises a drilling motor, non-magnetic collars and drill pipe. Drill pipe has a wall thickness that is less than the thickness of the drill collars. The drill pipe in the horizontal section of the wellbore carries a compressive load to push the drill bit rather than the tensile load seen in vertical wells. This compressive load may cause the drill pipe to bend excessively within a wellbore because of the relatively thin wall thickness.

As well profiles changed from vertical to deviated, new drill pipe such as heavy weight drill pipe was created to provide for increased flexibility over standard vertical drill collars. Deviated wells have a profile that is less than 90 degrees and maintains an angle in which gravity aids in pulling the heavy weight drill pipe in a downward direction applying weight to the drill bit. This helps to overcome frictional forces between the heavy weight drill pipe and the well bore. This heavy weight drill pipe added weight and stiffness over standard drill pipe. The heavy weight drill pipe worked well in deviated wells and the transition between vertical and horizontal wells (the build section) but was still insufficient as a solution to the horizontal section of the wellbore.

As the deviation in the wellbore approaches 90 degrees (horizontal), the useful gravity component contributing to weight on bit is reduced to zero which means that all of the force applied to the drill bit must be applied from the vertical or build sections. The transfer of weight is what creates the problem for drill pipe in compression. Drill pipe has a natural tendency to flex under its own weight causing the tube of the drill pipe to bend downwards toward the bottom section of the well bore in a horizontal orientation due to gravity. When a compressive force is applied to the drill pipe, the bend is increased until the mid-section of the pipe rubs on the well bore. As the drill pipe rubs on the well bore, it may become damaged and may begin to leak or break. In order to prevent or mitigate this bending, the drill pipe must be made stiffer. Generally, additional stiffness in drill pipe is created through adding mass to the drill pipe which in turn adds more weight to the drill pipe.

The addition of material and weight to the drill pipe in horizontal wells is a major contributing factor to the friction between drill pipe and wellbore. If the drill pipe were rotated with no load in a horizontal wellbore, the amount of friction would be attributed to the coefficient of friction between the drill pipe tool joints and the wellbore. This friction causes an issue in two directions. The first is additional rotational torque above the required amount to turn the drill bit. The second is the amount of force required to slide the pipe longitudinally along the wellbore to advance the bit. The sliding friction creates the largest problem while drilling horizontal wells. The amount of weight needed by the drill bit does not need to be increased to drill in a horizontal manner as opposed to a vertical manner. The additional weight required is attributed to overcoming the sum of frictional forces on the drill pipe. With each joint of drill pipe in the wellbore, the forces required to push the drilling assembly increases until the drill pipe bends and the mid-section of the pipe touches the wellbore. It is at this point when the friction problem becomes exponential. Only a percentage of the additional weight added to the drilling string reaches the drill bit while the remaining weight is transferred to rotational and sliding frictional forces.

Typically, a drill pipe cross sectional profile is simply an outer diameter circle and an inner diameter circle. This has provided the drilling industry with a viable design for the purposes of tensile loading, rotational torque loading and drilling fluid circulation. In many cases, there are elements that must pass through the conduit created by the drill pipe between the surface and directional tools located near the bit. This need for an open passageway for items such as MWD probes or activation balls limits the profile that can be used to increase stiffness. Stiffness should be created without sacrificing external dimensional characteristics and weight per foot of tubular. For any given material, the effective stiffness or rigidity of a tubular body is determined from the tubular length and the geometry of the body's cross-section in relation to an arbitrary bending/neutral axis. The traditional drill pipe consists of a circular outer diameter with a concentric inner diameter and creates a uniformly distributed mass while maximizing stiffness. This cross sectional profile exhibits a constant moment of inertia about any bending axis through their centers-of-mass. This is known as mechanical symmetry.

BRIEF SUMMARY

There is provided a drill pipe that has a tubular body. The tubular body has a first end, a second end, an outer wall and an inner wall. The outer wall has an outer circumference that is substantially cylindrical in shape. A first connection end is connected to the first end of the tubular body and a second connection end is connected to the second end of the tubular body. The first connection end and the second connection end have an inner wall and an outer wall. The outer wall of the first and second connection ends is substantially cylindrical in shape. The inner wall of the first and second connections ends define a central cavity. The first connection end and the second connection end are sized to allow for mating with a corresponding drill pipe. The inner wall of the tubular body defines a central cavity that is in fluid communication with the central cavity of the first connection end and the second connection end. The inner wall has at least one land and at least one groove. The at least one groove is twisted along the length of the tubular body.

In one embodiment, the area in cross section of the tubular body of the at least one groove is substantially the same as the area in cross section of the tubular body of the at least one land.

In one embodiment, the at least one groove is twisted along the length of the tubular body in a helical pattern. Each length of pipe may have more than one helical twist. The helical pattern may rotate clockwise or counter clockwise.

In one embodiment, the helical pattern has more than one rotation along the inner wall of the tubular body.

In one embodiment, the at least one groove twists along the length of the tubular body in an asymmetric pattern.

In one embodiment, the at least one groove twists along the length of the tubular body changes direction. The at least one groove may twist 180 degrees clockwise and then changes direction to twist 180 degrees counterclockwise.

In one embodiment, the at least one land has a top surface with an arcuate cross section. The arcuate cross section may be convex.

In one embodiment, the at least one groove has a bottom surface with an arcuate cross section. The arcuate cross section may be concave.

In one embodiment, the inner wall of at least one of the first connection end and the second connection end has at least one land and at least one groove. The at least one groove is a continuation of the at least one groove of the tubular body.

In one embodiment, the thickness of the tubular body between the outer wall and the inner wall of the at least one groove is 65% to 80% of average wall thickness. Average wall thickness may be substantially the same as the standard wall thickness of standard sized drill pipe.

There is also provided a drill pipe that has a tubular body. The tubular body has a first end, a second end, an outer wall and an inner wall. The outer wall has an outer circumference that is substantially cylindrical in shape. A first connection end is connected to the first end of the tubular body and a second connection end is connected to the second end of the tubular body. The first connection end and the second connection end have an inner wall and an outer wall. The outer wall of the first and second connection ends is substantially cylindrical in shape. The inner wall of the first and second connections ends define a central cavity. The first connection end and the second connection end is sized to allow for mating with a corresponding drill pipe. The inner wall of the tubular body defines a central cavity that is in fluid communication with the central cavity of the first connection end and the second connection end. The inner wall of the tubular body has at least one land and at least one groove. The area in cross section of the tubular body of the at least one groove is substantially the same as the area in cross section of the tubular body of the at least one land. The at least one groove has at least one helical twist along the length of the tubular body.

In one embodiment, the helical pattern may rotate clockwise while in another embodiment the helical pattern may rotate counter clockwise.

In one embodiment, the helical pattern has more than one rotation along the inner wall of the tubular body.

In one embodiment, the at least one land has a top surface with an arcuate cross section. The arcuate cross section may be convex.

In one embodiment, the at least one groove has a bottom surface with an arcuate cross section. The arcuate cross section may be concave.

In one embodiment, the inner wall of at least one of the first connection end and the second connection end has at least one groove. The at least one groove is a continuation of the at least one groove of the tubular body.

In one embodiment, the thickness of the tubular body between the outer wall and the inner wall of the at least one groove is 65% to 80% of average wall thickness. Average wall thickness may be substantially the same as the standard wall thickness of standard sized drill pipe.

There is also provided a drill pipe that has a tubular body. The tubular body has a first end, a second end, an outer wall and an inner wall. The outer wall has an outer circumference that is substantially cylindrical in shape. A first connection end is connected to the first end of the tubular body and a second connection end is connected to the second end of the tubular body. The first connection end and the second connection end have an inner wall and an outer wall. The outer wall of the first and second connection ends is substantially cylindrical in shape. The inner wall of the first and second connection ends defines a central cavity. The first connection end and the second connection end are sized to allow for mating with a corresponding drill pipe. The inner wall of the tubular body defines a central cavity that is in fluid communication with the central cavity of the first connection end and the second connection end. The inner wall is substantially cylindrical in shape. The inner wall has at least one groove that is twisted along the length of the tubular body.

In one embodiment, the inner wall also has at least one land.

In another embodiment, the at least one land and the at least one groove twist along the length of the tubular body in parallel spaced relation.

In one embodiment, the area in cross section of the tubular body of the at least one groove is substantially the same as the area in cross section of the tubular body of the at least one land.

In one embodiment, the at least one groove is twisted along the length of the tubular body in a helical pattern. Each length of pipe may have more than one helical twist. The helical pattern may rotate clockwise or counter clockwise.

In one embodiment, the at least one groove twists along the length of the tubular body in an asymmetric pattern.

In one embodiment, the at least one groove twists along the length of the tubular body changes direction. The at least one groove may twist 180 degrees clockwise and then changes direction to twist 180 degrees counter clockwise.

In one embodiment, the at least one land has a top surface with an arcuate cross section. The arcuate cross section may be convex.

In one embodiment, the at least one groove has a bottom surface with an arcuate cross section. The arcuate cross section may be concave.

In one embodiment, the inner wall of at least one of the first connection end and the second connection end has at least one groove. The at least one groove is a continuation of the at least one groove of the tubular body.

In one embodiment, the thickness of the tubular body between the outer wall and the inner wall of the at least one groove is 65% to 80% of average wall thickness. Average wall thickness may be substantially the same as the standard wall thickness of standard sized drill pipe.

There is also provided a drill pipe that has a tubular body. The tubular body has a first end, a second end, an outer wall and an inner wall. The outer wall has an outer circumference that is substantially cylindrical in shape. A first connection end is provided in connection with the first end of the tubular body and a second connection end is provided in connection with the second end of the tubular body. The first connection end and the second connection end each have an inner wall and an outer wall. The outer wall of the first and second connection ends are substantially cylindrical in shape. The inner wall of the first and second connection ends define a central cavity. The first connection end and the second connection end are sized to allow for mating with a corresponding drill pipe. The inner wall of the tubular body defines a central cavity that is in fluid communication with the central cavity of the first connection end and the second connection end. The inner wall has mechanical asymmetry created by at least one land and at least one groove such that the width between the inner wall and the outer wall is greater for the at least one land than for the at least one groove. The tubular body has at least two segments. The at least two segments are arranged such that adjacent segments have mechanical asymmetry in different orientations.

In one embodiment, the area in cross section of the tubular body of the at least one groove is substantially the same as the area in cross section of the tubular body of the at least one land.

In one embodiment, the inner wall of at least one of the first connection end and the second connection end has at least one groove. The at least one groove is a continuation of the at least one groove of the tubular body.

In one embodiment, the thickness of the tubular body between the outer wall and the inner wall of the at least one groove is 65% to 80% of average wall thickness.

There is also provided a drill string made up of at least two drill pipes. Each of the drill pipes has a tubular body and first and second connection ends. The tubular bodies have a first end, a second end, an outer wall and an inner wall. The outer wall of the tubular body has an outer circumference that is substantially cylindrical in shape. The first connection end is provided in connection with the first end of the tubular body and the second connection end is provided in connection with the second end of the tubular body. The first connection end and the second connection end have an inner wall and an outer wall. The outer wall of the first and second connection ends are substantially cylindrical in shape. The inner wall of the first and second connection ends define a central cavity. The first connection end and the second connection end is sized to allow for mating with a corresponding drill pipe. The inner wall of the tubular body defines a central cavity that is in fluid communication with the central cavity of the first connection end and the second connection end. The inner wall has mechanical asymmetry that is created by at least one land and at least one groove such that the width between the inner wall and the outer wall is greater for the at least one land than for the at least one groove. The at least two drill pipes are connected together such that adjacent drill pipes have mechanical asymmetry in different orientations.

BRIEF DESCRIPTION OF THE DRAWINGS

These and other features will become more apparent from the following description in which references are made to the following drawings, in which numerical references denote like parts. The drawings are for the purpose of illustration only and are not intended to in any way limit the scope of the invention to the particular embodiments shown.

DETAILED DESCRIPTION OF THE PREFERRED EMBODIMENTS

Figure 1:
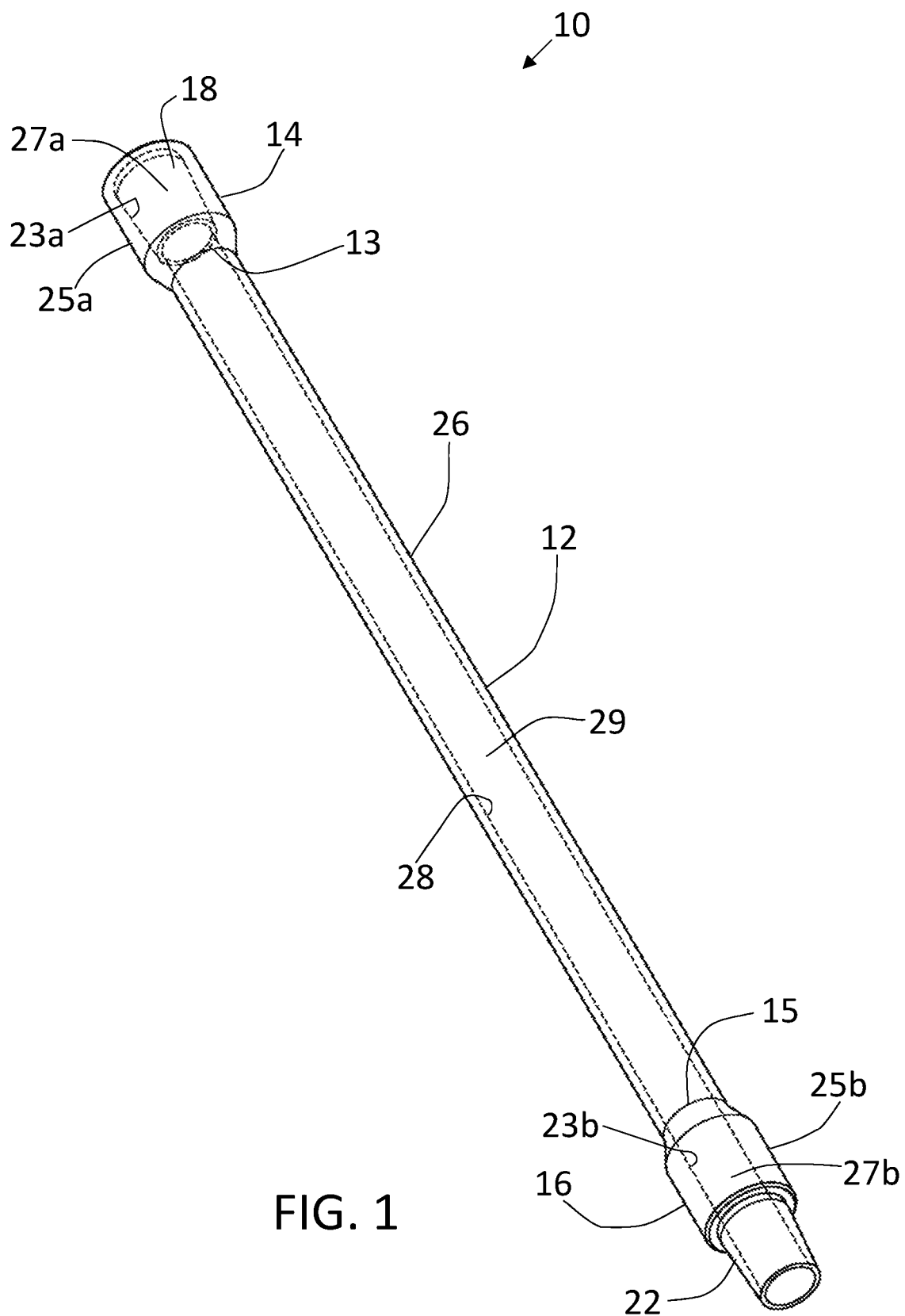
FIG. 1 is a perspective view, partially in section, of a drill pipe.

A drill pipe, generally identified by reference numeral 10, will now be described with reference to FIG. 1 through FIG. 6 and FIG. 9.

Figure 2:
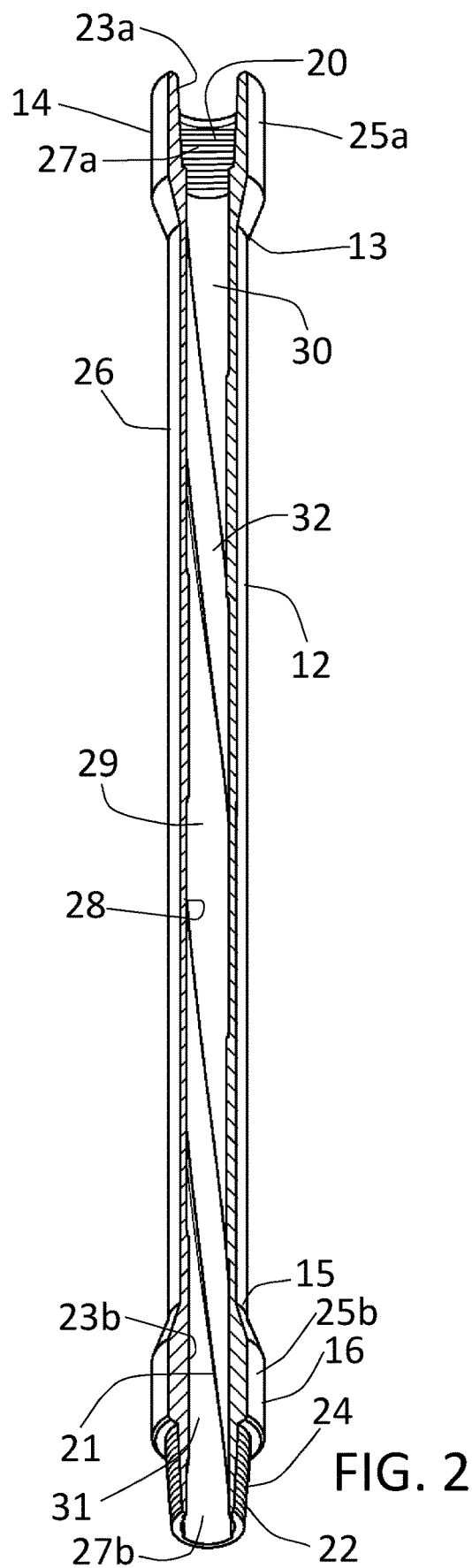
FIG. 2 is a perspective view, partially in section, of a drill pipe with a single helical groove.

Referring to FIG. 1, a drill pipe 10 has a tubular body 12 with a first end 13 and a second end 15. First end 13 of tubular body 12 is connected to a first connection end 14 and second end 15 of tubular body 12 is connected to a second connection end 16. First connection end 14 and second connection end 16 are tool joints sized to allow for mating with a corresponding drill pipe. First connection end 14 and second connection end 16 have an inner wall 23a and 23b, respectively, and an outer wall 25a and 25b, respectively. Outer wall 25a of first connection end 14 and outer wall 25b of second connection end 16 are substantially cylindrical in shape. Inner wall 23a of first connection end 14 defines a central cavity 27a and inner wall 23b of second connection end 16 defines a central cavity 27b. Referring to FIG. 2, in the embodiment shown, first connection end 14 has a female connection 18 with threads 20 on inner wall 23a and second connection end 16 has a male connection 22 with threads 24 on outer wall 25b. Female end 18 with threads 20 of a first drill pipe 10 may connect with male connection 22 with threads 24 of a second drill pipe 10. A person of skill will understand that first connection end 14 and second connection end 16 may be designed with connections other than threads 20 and 24. This may include the use of splines, welding or any other type of connection known in the art.

Referring to FIG. 1, first connection end 14 and second connection end 16 are typically enlarged in comparison to tubular body 12. First connection end 14 and second connection end 16 are typically friction welded to first end 13 and second end 15, respectively, of tubular body 12. A person of skill will understand that other methods of connecting first connection end 14 to first end 13 of tubular body 12 and second connection end 16 to second end 15 of tubular body 12 may be used. First connection end 14 and second connection end 16 are of sufficient strength to withstand excessive wear from drilling and connection and disconnection with adjacent drill pipes 10. First connection end 14 and second connection end 16 may be made of heat treated steel such that it has a higher strength than tubular body 12 which may be made of steel. The enlarged first connection end 14 and second connection end 16 may be used for gripping drill pipe 10 with pipe tongs which localizes any damage created by pipe tongs to the first connection end 14 and second connection end 16. This prevents damage to tubular body 12. It is natural in wellbores for first connection end 14 and second connection end 16 to contact the wellbore. The enlarged size and strength of materials used in first connection end 14 and second connection end 16 provides protection for this contact.

Figure 3:
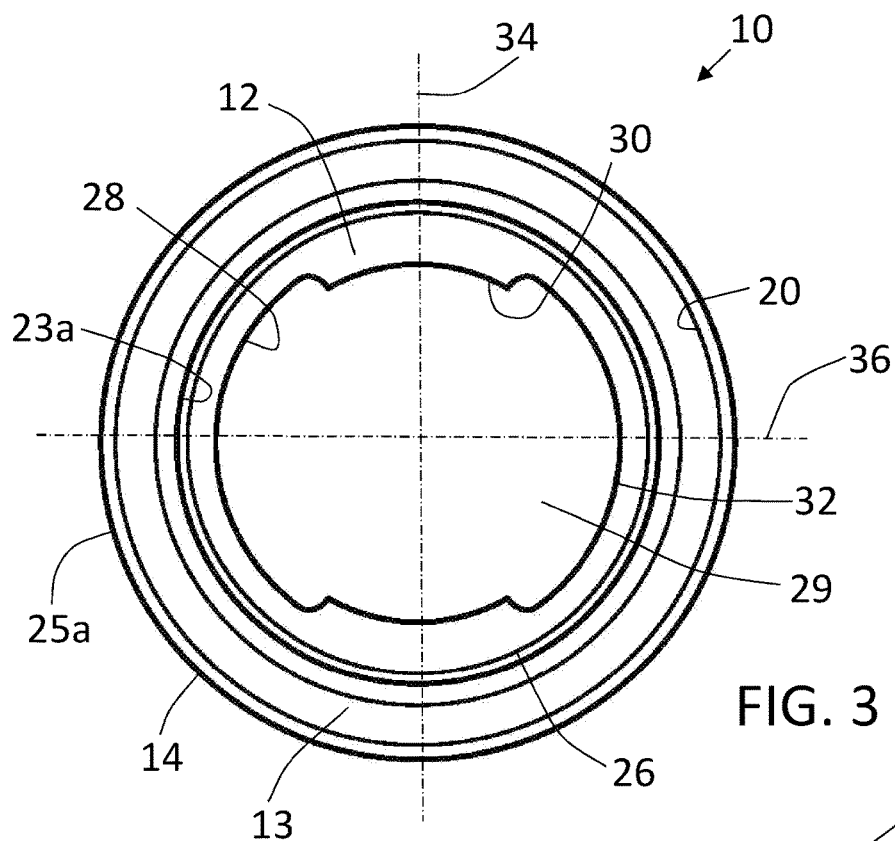
FIG. 3 is a top plan view of a drill pipe with two lands and two grooves.
Figure 4:
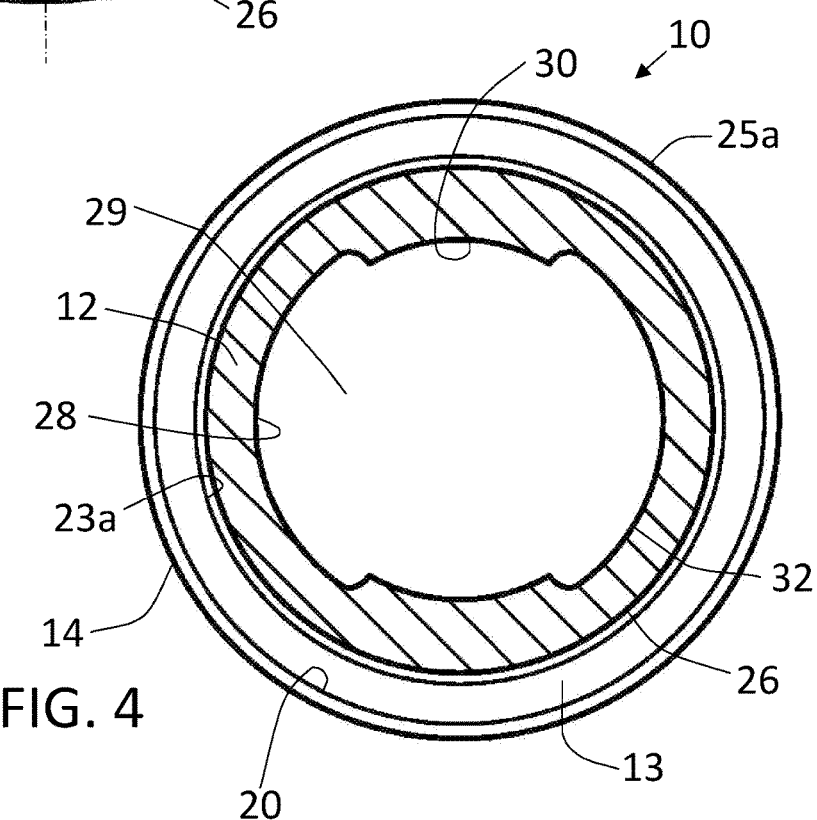
FIG. 4 is a top plan view, partially in section, of a drill pipe with two lands and two grooves.

Referring to FIG. 2, tubular body 12 has an outer wall 26 with an outer circumference that is substantially cylindrical in shape and an inner wall 28. Inner wall 28 defines a central cavity 29 through which drilling fluids may pass. Central cavity 29 is in fluid communication with central cavity 27a of first connection end 14 and central cavity 27b of second connection end 16 such that fluid may travel through central cavity 27a, central cavity 29 and central cavity 27b. Inner wall 28 has at least one land 30 and at least one groove 32. The width of tubular body 12 between outer wall 26 and inner wall 28 is greater at lands 30 than at grooves 32. Grooves twists along the length of tubular body 12. In the embodiment shown, there are two lands 30 and two grooves 32. A person of skill will understand that a single land 30 and groove 32 may be used or two or more lands 30 and grooves 32 may be used. Referring to FIG. 3, in the embodiment shown land 30 is the portion of inner wall 28 that is not a part of groove 32. Referring to FIG. 4, in the embodiment shown groove 32 is the portion of inner wall 28 that is not a part of land 30.

Referring to FIG. 2, in the embodiment shown, inner wall 23b of second connection end 16 has a groove 21 that corresponds to groove 32 on inner wall 28 of tubular body 12. Inner wall 23b also has a land 31 that corresponds to land 30 of tubular body 12. As groove 21 is a continuation of groove 32, land 31 is also continuous with land 30 of tubular body 12. The presence of groove 21 may be beneficial for mixing drilling fluid within drill pipe 10. A person of skill will understand that both first connection end 14 and second connection end 16 may have a groove 21 and land 31 or that neither first connection end 14 nor second connection end 16 may have a groove 21 and land 31.

Figure 5:
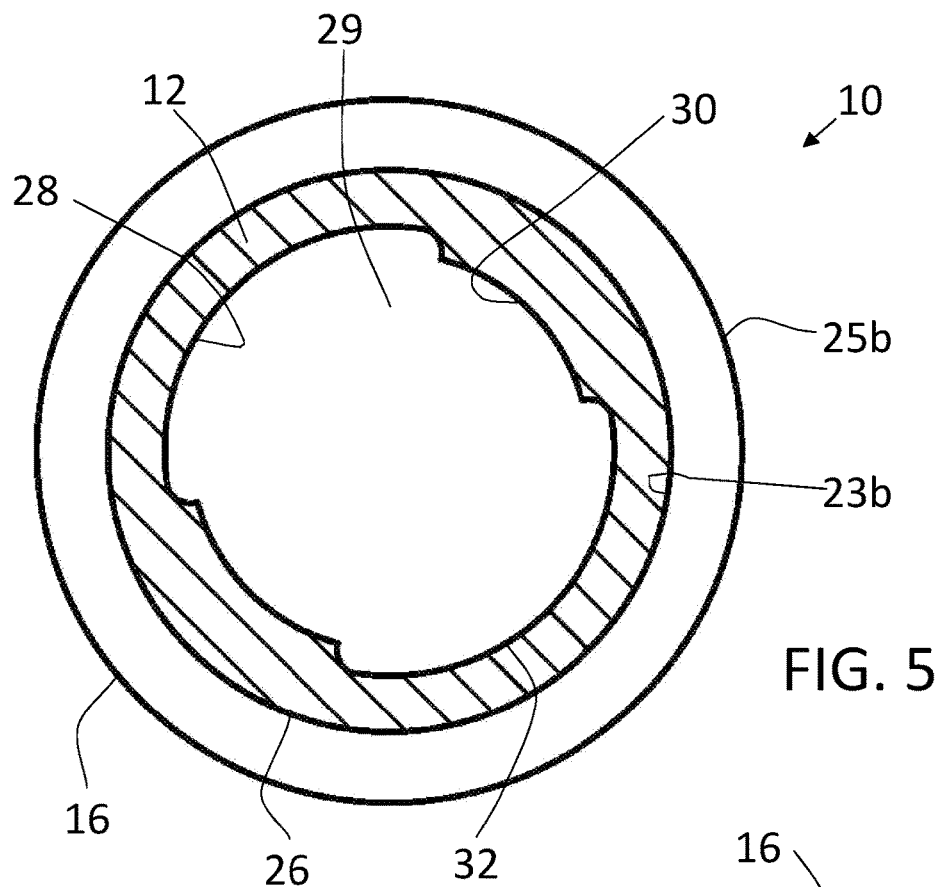
FIG. 5 is a cross sectional view of a drill pipe with two lands and two grooves in a different orientation.
Figure 6:
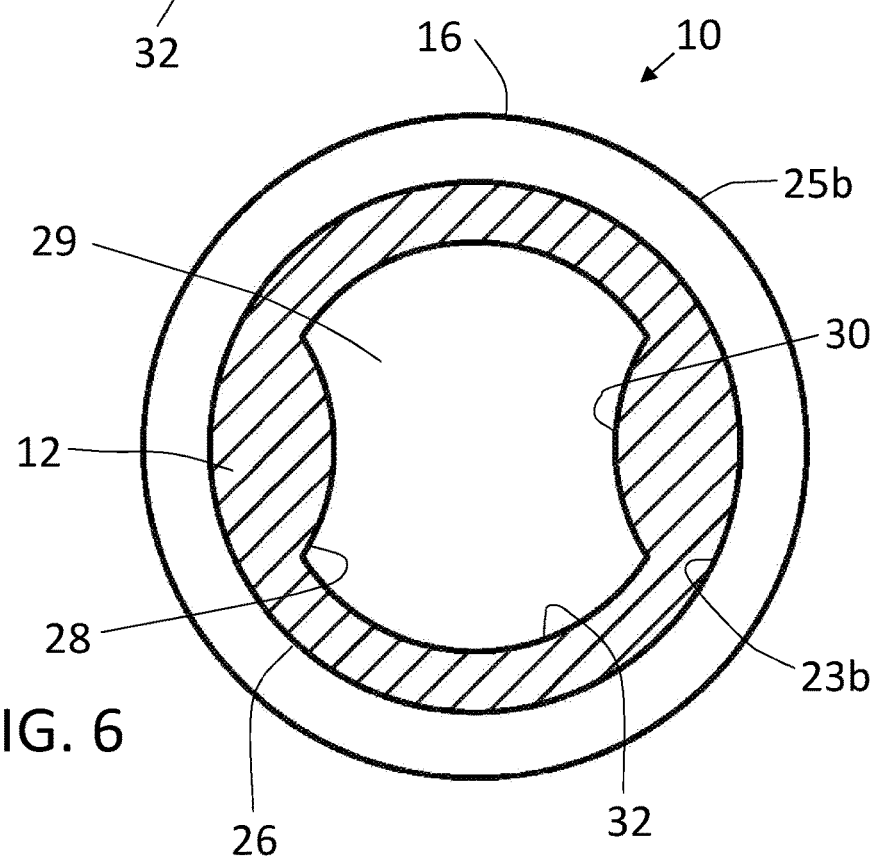
FIG. 6 is a cross sectional view of a drill pipe with a variation of two lands and two grooves.

Referring to FIG. 3, the cross section of drill pipe 10 possesses mechanical asymmetry unlike traditional drill pipes which possess mechanical symmetry. Mechanical asymmetry is seen in the cross section of drill pipe 10. The cross section has multiple moments of inertia through its center of mass depending upon the bending orientation. This modified cross section has increased stiffness along a strong axis 34 and decreased stiffness along a weak axis 36. The cross sectional profile of drill pipe 10 appears to be helically swept down the length of tubular body 12. The increased stiffness along strong axis 34 is used to combat weak axis 36 to create a tubular body 12 with stiffness that averages toward the strong moment of inertia. The overall mass of tubular body 12 remains constant irrespective of how the cross-sectional helical indexing is done as any given cross section of tubular body 12 is identically equal but simply oriented differently. The pitch or frequency of the helical profile will influence the overall effectiveness. Referring to FIG. 4 through FIG. 6, variations of the cross section of drill pipe 10 each with mechanical asymmetry are shown. A person of skill will understand that other cross sections may be used.

The thickness of tubular body 12 is different for lands 30 and grooves 32. To help prevent blow outs of drill pipe 10 during use, the thickness of tubular body 12 between outer wall 26 and inner wall 28 of grooves 32 should not be less than 50% of standard sized wall thickness. It is preferred that tubular body 12 thickness of grooves 32 is between 65% and 80% of standard sized wall thickness. When lands 32 and grooves 30 have substantially the same area in cross section the average wall thickness is preferably the same as the standard sized wall thickness. It will be understood by a person skilled in the art that average wall thickness of tubular body 12 may be different from wall thickness of standard sized pipe, however, average wall thickness will affect the weight of tubular body 12. Table 1 below sets out information related to standard pipe size. For example, a tubular body with an outer diameter of 2⅞ inches normally has a wall thickness of 0.362 inches. In one embodiment of drill pipe 10, the thickness of tubular body 12 between outer wall 26 and inner wall 28 of grooves 32 measures 0.250 inches. This represents a thickness of groove 32 approximately 69% of standard sized wall thickness.

TABLE 1

Drill Pipe Specifications

| Outer Diameter (in) | Nominal Weight (lb/ft) | Wall Thickness (in) | Inner Diameter (in) |
|---|---|---|---|
| 2⅜ | 6.65 | 0.280 | 1.815 |
| 2⅞ | 10.40 | 0.362 | 2.151 |
| 3½ | 13.30 | 0.368 | 2.764 |
| 3½ | 15.50 | 0.449 | 2.602 |
| 4 | 14.00 | 0.330 | 3.340 |
| 4 | 15.70 | 0.380 | 3.240 |
| 4½ | 16.60 | 0.337 | 3.826 |
| 4½ | 20.00 | 0.430 | 3.640 |
| 5 | 19.50 | 0.362 | 4.276 |
| 5 | 25.60 | 0.500 | 4.000 |
| 5½ | 21.90 | 0.361 | 4.778 |
| 5½ | 24.70 | 0.415 | 4.670 |
| 6⅝ | 25.20 | 0.330 | 5.965 |
| 6⅝ | 27.70 | 0.362 | 5.901 |

In the embodiment shown, the area in cross section of tubular body 12 of grooves 32 is substantially the same as the area in cross section of tubular body 12 of lands 30. By keeping the area in cross section of grooves 32 and lands 30 substantially the same, the weight of drill pipe 10 with lands 30 and grooves 32 may weigh substantially the same as a standard pipe that has an inner wall that is substantially cylindrical in shape. Since weight of a drill pipe affects the frictional forces on the bottom of a well bore, it is beneficial to prevent adding additional weight to drill pipe 10.

In the embodiment shown in FIG. 2, grooves 32 are made in a helical pattern along the length of tubular body 12. There may be a single helical twist such that the start of groove 32 and the end of groove 32 form a line along a vertical access. It will also be understood that groove 32 may have several helical twists along the length of tubular body 12. The helical pattern of grooves 32 may rotate either clockwise or counter clockwise. When used downhole, it may be beneficial to use a mixture of drill pipe 10 with clockwise rotations and counter clockwise rotations. Using drill pipe 10 with groove rotation in a clockwise or counter clockwise exclusively may lead to turbidity of drilling fluid within drill pipe 10 that could cause impurities to fall out of the fluid and build up on inner wall 28. By using a mixture of drill pipe 10 with both clockwise and counter clockwise rotations, this turbidity may be limited and limit the build up of impurities on inner wall 28.

Figure 9:
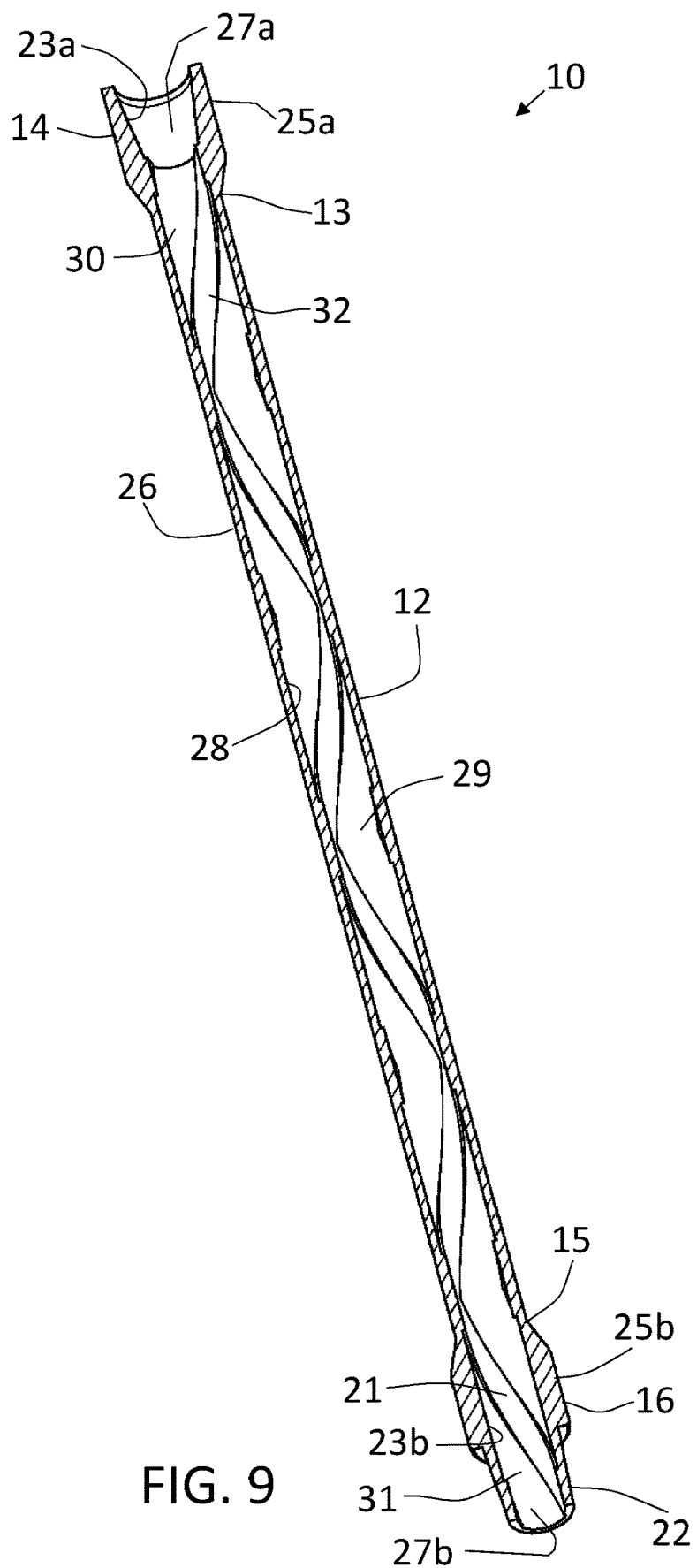
FIG. 9 is a perspective view, partially in section, of a variation of the drill pipe.

Referring to FIG. 9, grooves 32 change directions along the length of tubular body 12. This change of direction can create either a symmetrical or asymmetrical twist along the length of tubular body 12. In the embodiment shown, grooves 32 twist 180 degrees clockwise and then change directions to twist 180 degrees counterclockwise.

This design may allow for a reduction in the mass of the tube without compromising stiffness when compared to similarly stiff concentric circle drill pipe or the stiffness could be increased without increasing the mass as compared to similarly weighted concentric circle drill pipe. In either case, the tubular member could have improved rigidity with regards to bending, bending due to compression and elastic buckling. The internal spiral effect may allow for increased stiffness throughout the length of tubular body 12.

In the embodiment shown in FIG. 6, lands 30 have a top surface that has an arcuate cross section. This arcuate cross section is convex. Grooves 32 have a bottom surface that has an arcuate cross section. This arcuate cross section is concave. The use of arcuate cross sections may alleviate the risk of weak spots within tubular body 12 that could be created by sudden changes in wall thickness.

Variations:

A variation of a drill pipe, generally identified by reference numeral 100, will now be described with reference to FIG. 7 through FIG. 8.

Figure 7:
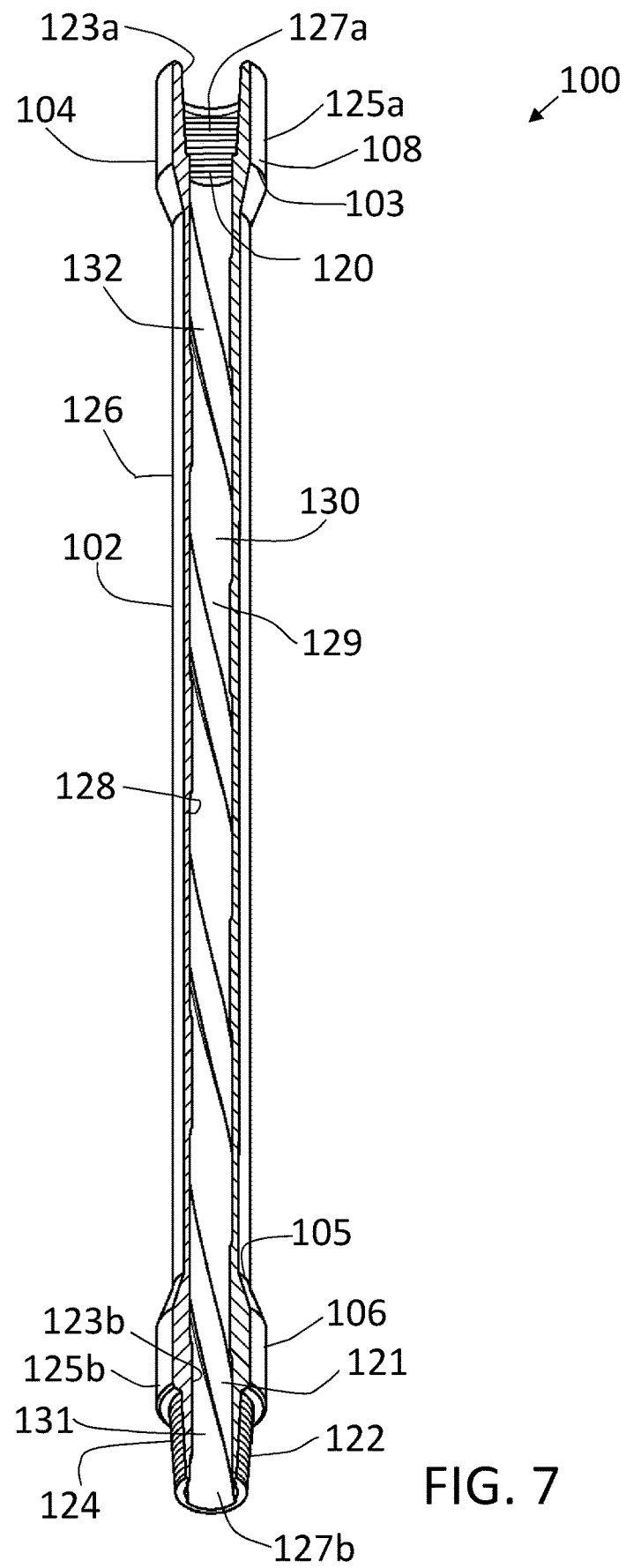
FIG. 7 is a perspective view, partially in section, of a variation of a drill pipe with more than one helical groove.

Referring to FIG. 7, a drill pipe 100 has a tubular body 102 with a first end 103 and a second end 105. First end 103 of tubular body 102 is connected to a first connection end 104 and second end 105 of tubular body 102 is connected to a second connection end 106. First connection end 104 and second connection end 106 are tool joints sized to allow for mating with a corresponding drill pipe. First connection end 104 and second connection end 106 have an inner wall 123a and 123b, respectively, and an outer wall 125a and 125b, respectively. Outer wall 125a of first connection end 104 and outer wall 125b of second connection end 106 are substantially cylindrical in shape. Inner wall 123a of first connection end 104 defines a central cavity 127a and inner wall 123b of second connection end 106 defines a central cavity 127b. In the embodiment shown, first connection end 104 has a female connection 108 with threads 120 on inner wall 123a and second connection end 106 has a male connection 122 with threads 124 on outer wall 125b. Female end 108 with internal threads 120 of a first drill pipe 100 may connect with male connection 122 with external threads 124 of a second drill pipe 100. A person of skill will understand that first connection end 104 and second connection end 106 may be designed with connections other than threads 120 and 124. This may include the use of splines, welding or any other type of connection known in the art.

First connection end 104 and second connection end 106 are typically enlarged in comparison to tubular body 102. First connection end 104 and second connection end 106 are typically friction welded to first end 103 and second end 105, respectively, of tubular body 102. A person of skill will understand that other methods of connecting first connection end 104 to first end 103 of tubular body 102 and second connection end 106 to second end 105 of tubular body 102 may be used. First connection end 104 and second connection end 106 are of sufficient strength to withstand excessive wear from drilling and connection and disconnection with adjacent drill pipes 100. First connection end 104 and second connection end 106 may be made of heat treated steel such that it has a higher strength than tubular body 102 which may be made of steel. The enlarged first connection end 104 and second connection end 106 may be used for gripping drill pipe 100 with pipe tongs which localizes any damage created by pipe tongs to the first connection end 104 and second connection end 106. This prevents damage to tubular body 102. It is natural in wellbores for first connection end 104 and second connection end 106 to contact the wellbore. The enlarged size and strength of materials used in first connection end 104 and second connection end 106 provides protection for this contact.

Tubular body 102 has an outer wall 126 with an outer circumference that is substantially cylindrical in shape and an inner wall 128. Inner wall 128 defines a central cavity 129 through which drilling fluids may pass. Central cavity 129 is in fluid communication with central cavity 127a of first connection end 104 and central cavity 127b of second connection end 106 such that fluid may travel through central cavity 127a, central cavity 129 and central cavity 127b. Inner wall 128 is substantially cylindrical in shape with at least one groove 132 that is twisted along the length of tubular body 102. To help prevent blow outs of drill pipe 100 during use, the thickness of tubular body 102 between outer wall 126 and inner wall 128 of grooves 132 should not be less than 50% of standard sized wall thickness. It is preferred that tubular body 102 thickness of grooves 132 be between 65% and 80% of standard sized wall thickness.

Referring to FIG. 7, in the embodiment shown, inner wall 123b of second connection end 106 has a groove 121 that corresponds to groove 132 on inner wall 128 of tubular body 102. Inner wall 123b also has a land 131 that corresponds to land 130 of tubular body 102. As groove 121 is a continuation of groove 132, land 131 is also continuous with land 130 of tubular body 102. The presence of groove 121 may be beneficial for mixing drilling fluid within drill pipe 100. A person of skill will understand that both first connection end 104 and second connection end 106 may have a groove 121 and land 131 or that neither first connection end 104 nor second connection end 106 may have a groove 121 and land 131.

Figure 8:
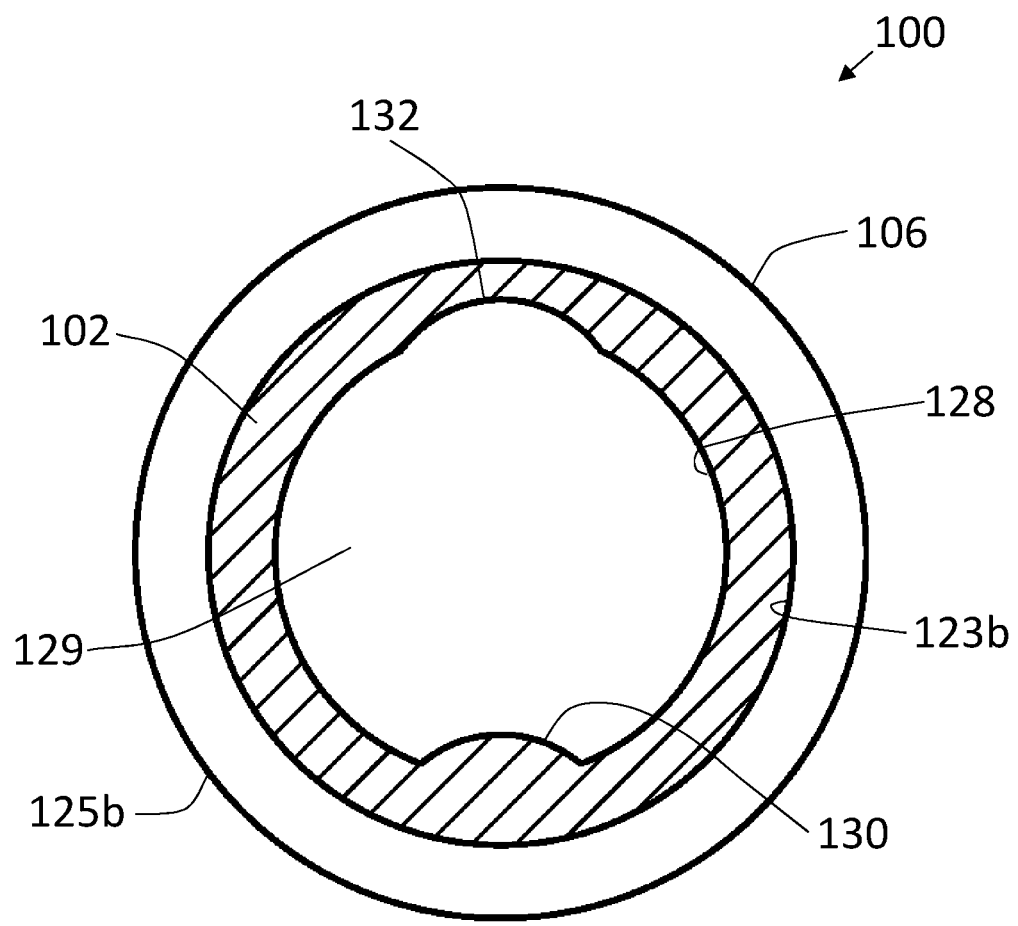
FIG. 8 is a cross sectional view of a drill pipe with a single land and a single groove.

In the embodiment shown in FIG. 8, inner wall 128 has a land 130. It will be understood by a person skilled in the art that inner wall 128 may have more than one land 130. Land 130 and groove 132 twist along the length of tubular body 102 in parallel spaced relation. To keep the weight of drill pipe 100 substantially the same as the weight of standard drill pipe (shown in Table 1) the area in cross section of tubular body 102 of grooves 132 may be substantially the same as the area in cross section of tubular body 102 of lands 130. In the embodiment shown, land 130 and groove 132 are positioned in alignment with each other. A person of skill will understand that land 130 and groove 132 may be positioned out of alignment with each other.

In the embodiment shown in FIG. 7, grooves 132 are preferably made in a helical pattern along the length of tubular body 102. There may be a single helical twist such that the start of groove 132 and the end of groove 132 form a line along a vertical access. It will also be understood that groove 132 may have several helical twists along the length of tubular body 102. The helical pattern of grooves 132 may rotate either clockwise or counter clockwise. When used downhole, it may be beneficial to use a mixture of drill pipe 100 with clockwise rotations and counter clockwise rotations. Using drill pipe 100 with groove rotation in a clockwise or counter clockwise exclusively may lead to turbidity of drilling fluid within drill pipe 100 that could cause impurities to fall out of the fluid and build up on inner wall 128. By using a mixture of drill pipe 100 with both clockwise and counter clockwise rotations, this turbidity may be limited and limit the build up of impurities on inner wall 128.

Figure 10:
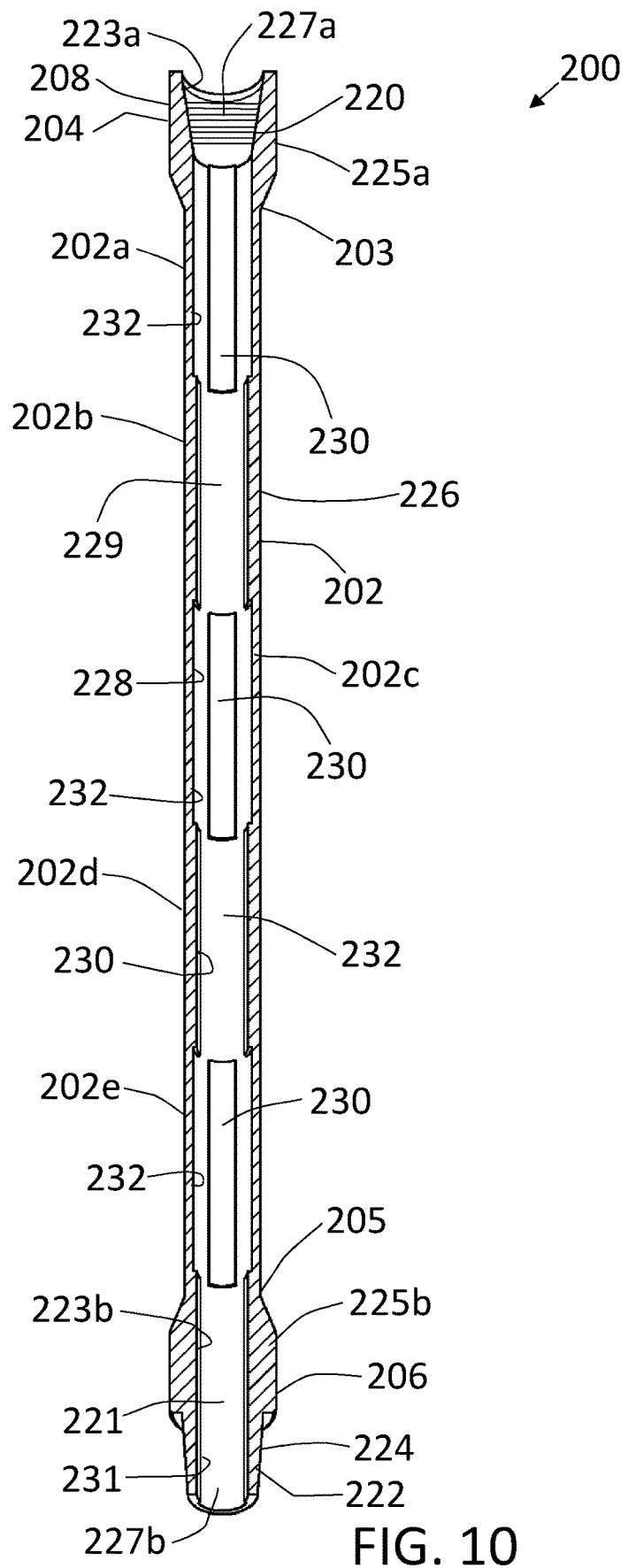
FIG. 10 is a perspective view, partially in section, of a further variation of the drill pipe.

A variation of a drill pipe, generally identified by reference numeral 200, will now be described with reference to FIG. 10.

A drill pipe 200 has a tubular body 202 with a first end 203 and a second end 205. First end 203 of tubular body 202 is connected to a first connection end 204 and second end 205 of tubular body 202 is connected to a second connection end

206. First connection end 204 and second connection end 206 are tool joints sized to allow for mating with a corresponding drill pipe. First connection end 204 and second connection end 206 have an inner wall 223a and 223b, respectively, and an outer wall 225a and 225b, respectively. Outer wall 225a of first connection end 204 and outer wall 225b of second connection end 206 are substantially cylindrical in shape. Inner wall 223a of first connection end 204 defines a central cavity 227a and inner wall 223b of second connection end 206 defines a central cavity 227b. In the embodiment shown, first connection end 204 has a female connection 208 with threads 220 on inner wall 223a and second connection end 206 has a male connection 222 with threads 224 on outer wall 225b. Female end 208 with internal threads 220 of a first drill pipe 200 may connect with male connection 222 with external threads 224 of a second drill pipe 200. A person of skill will understand that first connection end 204 and second connection end 206 may be designed with connections other than threads 220 and 224. This may include the use of splines, welding or any other type of connection known in the art.

First connection end 204 and second connection end 206 are typically enlarged in comparison to tubular body 202. First connection end 204 and second connection end 206 are typically friction welded to first end 203 and second end 205, respectively, of tubular body 202. A person of skill will understand that other methods of connecting first connection end 204 to first end 203 of tubular body 202 and second connection end 206 to second end 205 of tubular body 202 may be used. First connection end 204 and second connection end 206 are of sufficient strength to withstand excessive wear from drilling and connection and disconnection with adjacent drill pipes 200. First connection end 204 and second connection end 206 may be made of heat treated steel such that it has a higher strength than tubular body 202 which may be made of steel. The enlarged first connection end 204 and second connection end 206 may be used for gripping drill pipe 200 with pipe tongs which localizes any damage created by pipe tongs to the first connection end 204 and second connection end 206. This prevents damage to tubular body 202. It is natural in wellbores for first connection end 204 and second connection end 206 to contact the wellbore. The enlarged size and strength of materials used in first connection end 204 and second connection end 206 provides protection for this contact.

Tubular body 202 has an outer wall 226 with an outer circumference that is substantially cylindrical in shape and an inner wall 228. Inner wall 228 defines a central cavity 229 through which drilling fluids may pass. Central cavity 229 is in fluid communication with central cavity 227a of first connection end 204 and central cavity 227b of second connection end 206 such that fluid may travel through central cavity 227a, central cavity 229 and central cavity 227b without obstruction.

Inner wall 228 has mechanical asymmetry created by a land 230 and a groove 232. A person of skill will understand that there may be more than one land 230 and one groove 232. The width between inner wall 228 and outer wall 226 is greater for lands 230 than for grooves 232. To help prevent blow outs of drill pipe 200 during use, the thickness of tubular body 202 between outer wall 226 and inner wall 228 of grooves 232 should not be less than 50% of standard sized wall thickness. It is preferred that tubular body 202 thickness of grooves 232 be between 65% and 80% of standard sized wall thickness. In the embodiment shown, tubular body 202 is divided into five segments 202a, 202b, 202c, 202d and 202e. Tubular body segments 202a, 202b, 202c, 202d and 202e are arranged such that adjacent segments have mechanical asymmetry in different orientations. In the embodiment shown, each segment is rotated 90 degrees to the previous segment. To keep the weight of drill pipe 200 substantially the same as the weight of standard drill pipe (shown in Table 1) the cross section of tubular body 202 of grooves 232 may be substantially the same as the area in cross section of tubular body 202 of lands 230.

In the embodiment shown, inner wall 223b of second connection end 206 has a groove 221 and a land 231. In the embodiment shown, groove 221 and land 231 have a different orientation than tubular body segment 202e. A person of skill will understand that groove 221 may be continuous with groove 232 of tubular body segment 202e and land 231 may be continuous with land 230 of tubular body segment 202e. A person of skill will understand that both first connection end 204 and second connection end 206 may have a groove 221 and land 231 or that neither first connection end 204 nor second connection end 206 may have a groove 221 and land 231.

Figure 11:
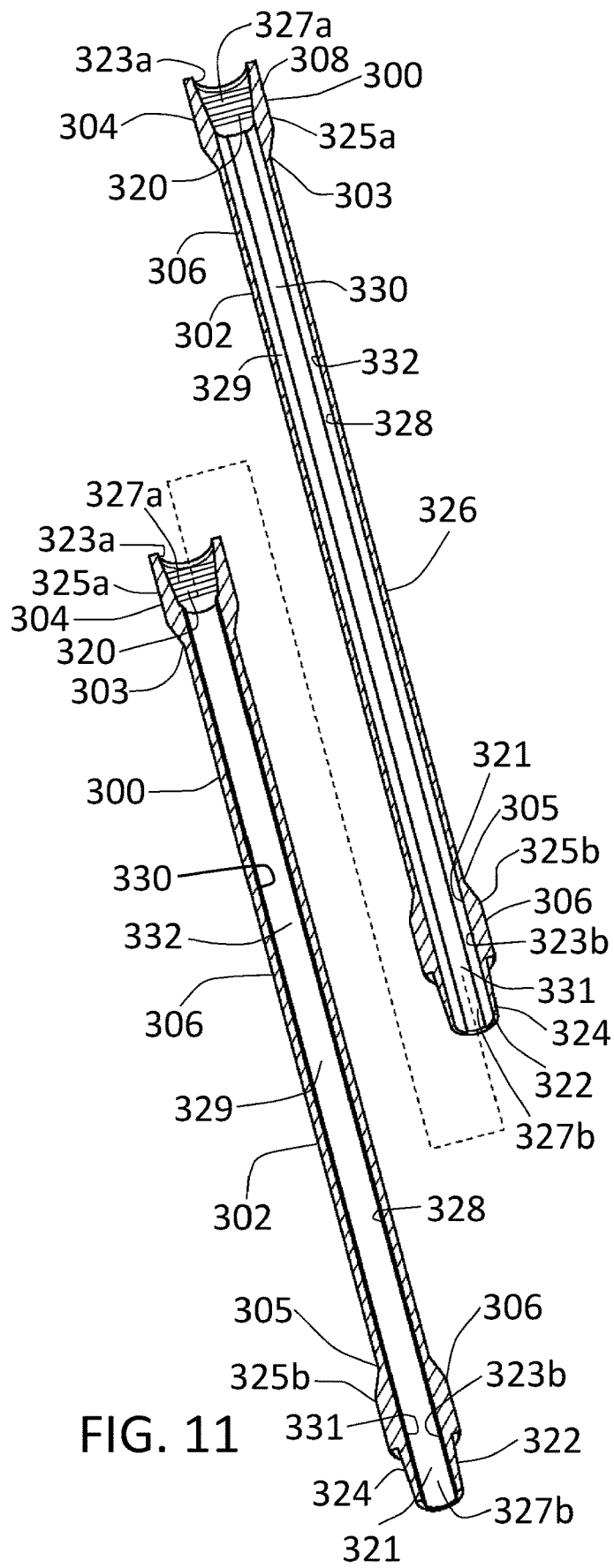
FIG. 11 is a perspective view, partially in section, of two drill pipes being used to create a drill string.

A variation of a drill pipe, generally identified by reference numeral 300, will now be described with reference to FIG. 11.

A drill pipe 300 has a tubular body 302 with a first end 303 and a second end 305. First end 303 of tubular body 302 is connected to a first connection end 304 and second end 305 of tubular body 302 is connected to a second connection end 306. First connection end 304 and second connection end 306 are tool joints sized to allow for mating with a corresponding drill pipe. First connection end 304 and second connection end 306 have an inner wall 323a and 323b, respectively, and an outer wall 325a and 325b, respectively. Outer wall 325a of first connection end 304 and outer wall 325b of second connection end 306 are substantially cylindrical in shape. Inner wall 323a of first connection end 304 defines a central cavity 327a and inner wall 323b of second connection end 306 defines a central cavity 327b. In the embodiment shown, first connection end 304 has a female connection 308 with threads 320 on inner wall 323a and second connection end 306 has a male connection 322 with threads 324 on outer wall 325b. Female end 308 with internal threads 320 of a first drill pipe 300 may connect with male connection 322 with external threads 324 of a second drill pipe 300. A person of skill will understand that first connection end 304 and second connection end 306 may be designed with connections other than threads 320 and 324. This may include the use of splines, welding or any other type of connection known in the art.

First connection end 304 and second connection end 306 are typically enlarged in comparison to tubular body 302. First connection end 304 and second connection end 306 are typically friction welded to first end 303 and second end 305, respectively, of tubular body 302. A person of skill will understand that other methods of connecting first connection end 304 to first end 303 of tubular body 302 and second connection end 306 to second end 305 of tubular body 302 may be used. First connection end 304 and second connection end 306 are of sufficient strength to withstand excessive wear from drilling and connection and disconnection with adjacent drill pipes 300. First connection end 304 and second connection end 306 may be made of heat treated steel such that it has a higher strength than tubular body 302 which may be made of steel. The enlarged first connection end 304 and second connection end 306 may be used for gripping drill pipe 300 with pipe tongs which localizes any damage created by pipe tongs to the first connection end 304 and second connection end 306. This prevents damage to tubular body 302. It is natural in wellbores for first connection end 304 and second connection end 306 to contact the wellbore. The enlarged size and strength of materials used in first connection end 304 and second connection end 306 provides protection for this contact.

Tubular body 302 has an outer wall 326 with an outer circumference that is substantially cylindrical in shape and an inner wall 328. Inner wall 328 defines a central cavity 329 through which drilling fluids may pass. Central cavity 329 is in fluid communication with central cavity 327a of first connection end 304 and central cavity 327b of second connection end 306 such that fluid may travel through central cavity 327a, central cavity 329 and central cavity 327b without obstruction.

Inner wall 328 has mechanical asymmetry created by a land 330 and a groove 332. A person of skill will understand that there may be more than one land 330 and one groove 332. The width between inner wall 328 and outer wall 326 is greater for lands 330 than for grooves 332. To help prevent blow outs of drill pipe 300 during use, the thickness of tubular body 302 between outer wall 326 and inner wall 328 of grooves 332 should not be less than 50% of standard sized wall thickness. It is preferred that tubular body 302 thickness of grooves 332 be between 65% and 80% of standard sized wall thickness. To keep the weight of drill pipe 300 substantially the same as the weight of standard drill pipe (shown in Table 1) the cross section of tubular body 302 of grooves 332 may be substantially the same as the area in cross section of tubular body 302 of lands 330. In the embodiment shown, lands 330 and grooves 332 run axially along the length of tubular body 302.

In the embodiment shown, inner wall 323b of second connection end 306 has a groove 321 and a land 331. In the embodiment shown, groove 321 and land 331 have a different orientation than tubular body 302. A person of skill will understand that groove 321 may be continuous with groove 332 of tubular body 302 and land 331 may be continuous with land 330 of tubular body 302e. A person of skill will understand that both first connection end 304 and second connection end 306 may have a groove 321 and land 331 or that neither first connection end 304 nor second connection end 306 may have a groove 321 and land 331.

When drill pipe 300 is used in a drill string, adjacent pipes should have mechanical asymmetry in different orientations. As can be seen, the lands 330 and grooves 332 between adjacent pipes do not align. The strong axis and weak axis changes with each adjacent drill pipe 300 in the drill string. This may have the overall effect of increasing overall strength of the drill string. A person of skill will understand that the use of shorter lengths of drill pipe are more likely to lead to an increase in overall strength while limiting bending along the weak axis of drill pipe 300.

Any use herein of any terms describing an interaction between elements is not meant to limit the interaction to direct interaction between the subject elements, and may also include indirect interaction between the elements such as through secondary or intermediary structure unless specifically stated otherwise.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent that changes may be made to the illustrative embodiments, while falling within the scope of the invention. As such, the scope of the following claims should not be limited by the preferred embodiments set forth in the examples and drawings described above, but should be given the broadest interpretation consistent with the description as a whole.

What is claimed is:

1. A drill pipe, comprising:
    a tubular body having a first end, a second end, an outer wall and an inner wall, the outer wall having an outer circumference being substantially cylindrical in shape along an entire length of the tubular body, the tubular body being capable of receiving a rotary torque from a surface drive and conveying the rotary torque to a drill bit, the tubular body being capable of carrying a tensile load;
    a first connection end in connection with the first end of the tubular body and a second connection end in connection with the second end of the tubular body to create a unitary body, the first connection end and the second connection end having an inner wall and an outer wall, the outer wall of the first connection end and the second connection end being substantially cylindrical in shape and the inner wall of the first connection end and the second connection end each defining a central cavity, the first connection end and the second connection end being sized to allow for mating with a corresponding drill pipes, the first connection end and the second connection end having threads to allow for mating with the corresponding drill pipe; and
    the inner wall of the tubular body defining a central cavity in fluid communication with the central cavity of the first connection end and the second connection end, the inner wall of the tubular body having at least one land and at least one groove such that the central cavity has a non-cylindrical cross-section at any point along the length of the tubular body, the at least one groove twisting along the entire length of the tubular body such that a twisting flow path of drilling fluid from the first end of the tubular body to the second end of the tubular body is created, the at least one land and the at least one groove being distinct from the threads of the first connection end and the second connection end, and the at least one land having a cross-sectional land wall thickness and the at least one groove having a cross-sectional groove wall thickness, the cross-sectional land wall thickness being greater than the cross-sectional groove wall thickness.

2. The drill pipe of claim 1 wherein the area in cross section of the tubular body of the at least one groove is substantially the same as the area in cross section of the tubular body of the at least one land.

3. The drill pipe of claim 1 wherein the at least one groove has a helical pattern.

4. The drill pipe of claim 3 wherein the helical pattern rotates clockwise.

5. The drill pipe of claim 3 wherein the helical pattern rotates counter clockwise.

6. The drill pipe of claim 3 wherein the helical pattern has more than one rotation along the inner wall of the tubular body.

7. The drill pipe of claim 1 wherein the at least one groove twists along the length of the tubular body in an asymmetric pattern.

8. The drill pipe of claim 1 wherein the at least one groove twisting along the length of the tubular body changes direction.

9. The drill pipe of claim 1 wherein the at least one land has a top surface having an arcuate cross section.

10. The drill pipe of claim 9 wherein the arcuate cross section is convex.

11. The drill pipe of claim 1 wherein the at least one groove has a bottom surface having an arcuate cross section.

12. The drill pipe of claim 11 wherein the arcuate cross section is concave.

13. The drill pipe of claim 1 wherein the inner wall of at least one of the first connection end and the second connection end having at least one land and at least one groove, the at least one groove being a continuation of the at least one groove of the tubular body.

14. The drill pipe of claim 1 wherein the cross-sectional thickness of the tubular body between the outer wall and the inner wall of the at least one groove is 65% to 80% of average wall thickness where average wall thickness is calculated by adding the cross-sectional land wall thickness of each of the at least one land with the cross-sectional groove wall thickness of each of the at least one groove and dividing by a sum of the number of lands and grooves.

15. A drill pipe, comprising:
a tubular body having a first end, a second end, an outer wall and an inner wall, the outer wall having an outer circumference being substantially cylindrical in shape along an entire length of the tubular body, the tubular body being capable of receiving a rotary torque from a surface drive and conveying the rotary torque to a drill bit, the tubular body being capable of carrying a tensile load;
a first connection end in connection with the first end of the tubular body and a second connection end in connection with the second end of the tubular body to create a unitary body, the first connection end and the second connection end having an inner wall and an outer wall, the outer wall of the first connection end and the second connection end being substantially cylindrical in shape and the inner wall of the first connection end and the second connection end each defining a central cavity, the first connection end and the second connection end being sized to allow for mating with a corresponding drill pipe, the first connection end and the second connection end having threads to allow for mating with the corresponding drill pipe; and
the inner wall of the tubular body defining a central cavity in fluid communication with the central cavity of the first connection end and the second connection end, the inner wall of the tubular body having at least one land and at least one groove such that the central cavity has a non-cylindrical cross-section at any point along the length of the tubular body, the at least one land and the at least one groove being distinct from the threads of the first connection end and the second connection end, the area in cross section of the tubular body of the at least one groove is substantially the same as the area in cross section of the tubular body of the at least one land, the at least one groove having at least one helical twist along the entire length of the tubular body such that a helical twisting flow path of drilling fluid from the first end of the tubular body to the second end of the tubular body is created, and the at least one land having a cross-sectional land wall thickness and the at least one groove having a cross-sectional groove wall thickness, the cross-sectional land wall thickness being greater than the cross-sectional groove wall thickness.

16. The drill pipe of claim 15 wherein the at least one helical twist rotates clockwise.

17. The drill pipe of claim 16 wherein the at least one helical twist has more than one rotation along the inner wall of the tubular body.

18. The drill pipe of claim 15 wherein the at least one helical twist rotates counter clockwise.

19. The drill pipe of claim 15 wherein the at least one land has a top surface having an arcuate cross section.

20. The drill pipe of claim 19 wherein the arcuate cross section is convex.

21. The drill pipe of claim 15 wherein the at least one groove has a bottom surface having an arcuate cross section.

22. The drill pipe of claim 21 wherein the arcuate cross section is concave.

23. The drill pipe of claim 15 wherein the inner wall of at least one of the first connection end and the second connection end having at least one groove, the at least one groove being a continuation of the at least one groove of the tubular body.

24. The drill pipe of claim 15 wherein the cross-sectional thickness of the tubular body between the outer wall and the inner wall of the at least one groove is 65% to 80% of average wall thickness where average wall thickness is calculated by adding the cross-sectional land wall thickness of each of the at least one land with the cross-sectional groove wall thickness of each of the at least one groove and dividing by a sum of the number of lands and grooves.

25. A drill pipe comprising:
a tubular body having a first end, a second end, an outer wall and an inner wall, the outer wall having an outer circumference being substantially cylindrical in shape along an entire length of the tubular body, the tubular body being capable of receiving a rotary torque from a surface drive and conveying the rotary torque to a drill bit, the tubular body being capable of carrying a tensile load;
a first connection end in connection with the first end of the tubular body and a second connection end in connection with the second end of the tubular body to create a unitary body, the first connection end and the second connection end having an inner wall and an outer wall, the outer wall of the first connection end and the second connection end being substantially cylindrical in shape and the inner wall of the first connection end and the second connection end each defining a central cavity, the first connection end and the second connection end being sized to allow for mating with a corresponding drill pipe, the first connection end and the second connection end having threads to allow for mating with the corresponding drill pipe; and
the inner wall of the tubular body defining a central cavity in fluid communication with the central cavity of the first connection end and the second connection end, the inner wall having at least one groove such that the central cavity has a non-cylindrical cross-section at any point along the length of the tubular body, the at least one groove twisting along the entire length of the tubular body such that a twisting flow path of drilling fluid from the first end of the tubular body to the second end of the tubular body is created, the at least one groove being distinct from the threads of the first connection end and the second connection end, the at least one groove having a cross-sectional groove wall thickness less than the thickness of the tubular body between the inner wall and the outer wall excluding the groove.

26. The drill pipe of claim 25 wherein the inner wall has at least one land.

27. The drill pipe of claim 26 wherein the at least one land and the at least one groove twist along the length of the tubular body in parallel spaced relation.

28. The drill pipe of claim 26 wherein the area in cross section of the tubular body of the at least one groove is substantially the same as the area in cross section of the tubular body of the at least one land.

29. The drill pipe of claim 26 wherein the at least one land has a top surface having an arcuate cross section.

30. The drill pipe of claim 29 wherein the arcuate cross section is convex.

31. The drill pipe of claim 25 wherein the at least one groove has a helical pattern.

32. The drill pipe of claim 31 wherein the helical pattern rotates clockwise.

33. The drill pipe of claim 31 wherein the helical pattern rotates counter clockwise.

34. The drill pipe of claim 31 wherein the helical pattern has more than one rotation along the inner wall of the tubular body.

35. The drill pipe of claim 25 wherein the at least one groove twists along the length of the tubular body in an asymmetric pattern.

36. The drill pipe of claim 25 wherein the at least one groove twisting along the length of the tubular body changes direction.

37. The drill pipe of claim 25 wherein the at least one groove has a bottom surface having an arcuate cross section.

38. The drill pipe of claim 37 wherein the arcuate cross section is concave.

39. The drill pipe of claim 25 wherein the inner wall of at least one of the first connection end and the second connection end having at least one groove, the at least one groove being a continuation of the at least one groove of the tubular body.

40. The drill pipe of claim 25 wherein the cross-sectional thickness of the tubular body between the outer wall and the inner wall of the at least one groove is 65% to 80% of average wall thickness where average wall thickness is calculated by adding the cross-sectional land wall thickness of each of the at least one land with the cross-sectional groove wall thickness of each of the at least one groove and dividing by a sum of the number of lands and grooves.

* * * * *